Dec. 10, 1963   M. C. NEUMAN ETAL   3,113,591
NON-LEAKAGE TYPE SLIDE VALVE
Filed July 19, 1960                 2 Sheets-Sheet 2

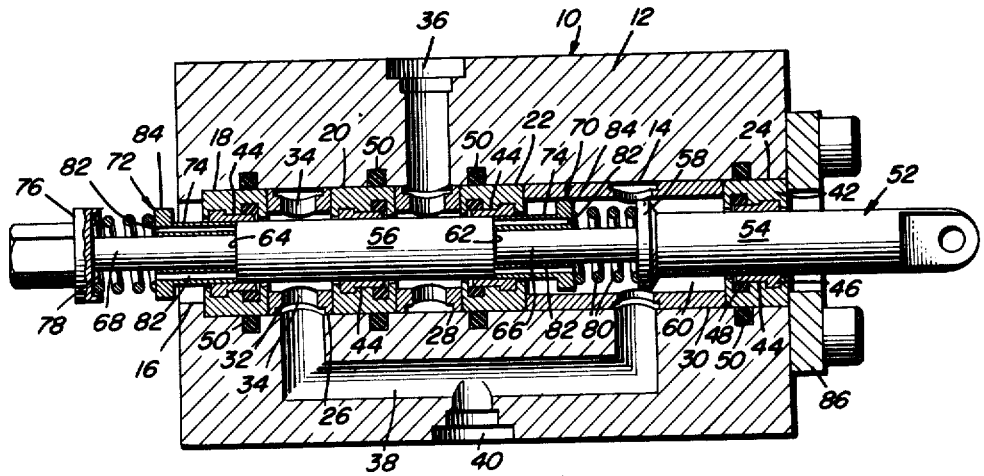

INVENTORS
Milton C. Neuman
BY Kenneth A. Riach

Walter G. Finch
ATTORNEY 3,113,591
NON-LEAKAGE TYPE SLIDE VALVE
Milton C. Neuman, Champlin, and Kenneth A. Riach, Minneapolis, Minn., assignors to Northern Ordnance, Incorporated, Fridley, Minn., a corporation of Minnesota
Filed July 19, 1960, Ser. No. 43,773
18 Claims. (Cl. 137—627.5)

This invention relates generally to valves, and more particularly it pertains to non-leaking type slide valves.

In a co-pending application entitled "Shaft and Piston Seal," Serial Number 33,786, filed June 3, 1960, there is described a novel shaft seal which also provides a bearing surface.

One of the attributes of this shaft seal is the provision and retention of an abrupt, relatively hard edge for cleaning the moving shaft free of foreign particles of matter. Because of the resilient nature of this edge in an application to spool type valves, it is necessary to devise a new arrangement to continuously support this edge while the spool face passes thereacross during valving.

It is, therefore, a primary object of this invention to provide an improved non-leaking sliding valve which incorporates a cartridge type resilient sealing assembly and a spool arrangement which enables the spool to re-enter the seal.

Another object of this invention is to provide a valve spool arrangement having a retractable valving face for minimizing seal and part wear.

Another object of this invention is to provide a non-leaking type slide valve for hydraulic and pneumatic systems which will hold pressure for extended periods with zero leakage of the fluid medium.

Still another object of this invention is to provide a non-leaking type slide valve which will function satisfactorily, without medium leakage in gas or liquid systems, from an operational and maintenance standpoint over a wide range of conditions.

These and other objects and attendant advantages of this invention will become more readily apparent and understood from the following specification and accompanying drawings in which:

FIG. 1 is a vertical section, partly in elevation, of a non-leaking type slide valve assembly incorporating novel features of this invention and showing the valve thereof in its centered or closed position;

FIG. 2 is a vertical section, partly in elevation, depicting the valve assembly of FIG. 1 with the valve translating in either direction;

Figure 3:
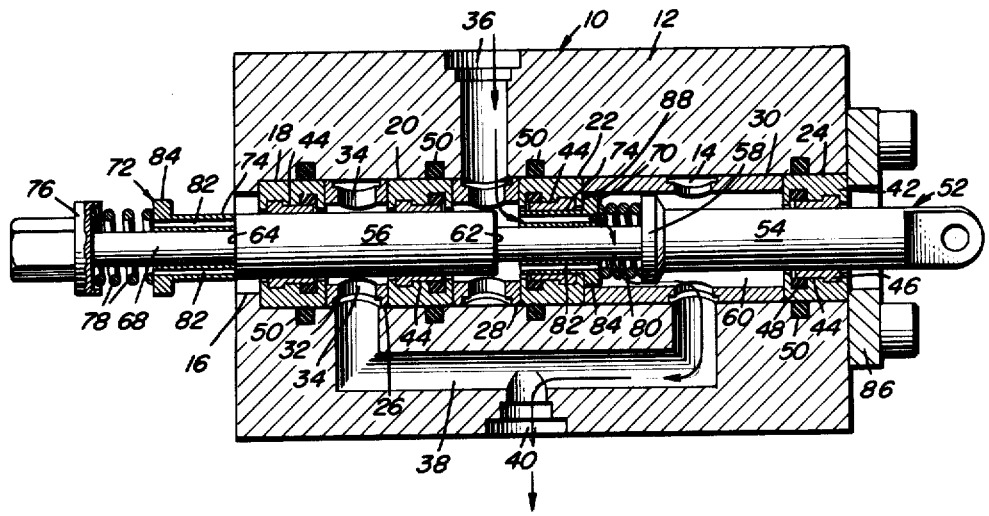
FIG. 3 is a vertical section, partly in elevation, of the valve assembly of FIG. 1 at the extreme left or open position.

Referring now to the details of the drawings in FIG. 1, there is shown a valving assembly indicated generally by reference numeral 10. The valving assembly 10 consists of a valve block or body 12 having a cylindrical hole opening 14 bored therethrough and counterbored so as to provide a shoulder 16 at one end. Four identical cartridge type seal assemblies 18, 20, 22 and 24 are mounted within the hole or opening 14, and are spaced from each other by three thin-walled tubular spacers 26, 28, and 30, with spacer 30 being of greater length than spacers 26 and 28.

These spacers 26, 28 and 30 each have an outer annular groove 32 provided therein. Several spaced radial holes or apertures 34 pierce the wall of each spacer 26, 28, and 30, and communicate with the annular groove 32 provided in its respective spacer 26, 28, and 30.

The groove 32 of the center spacer 28 communicates with an inlet port 36 provided in the body 12 of the valving assembly 10, while the two outer spacers 26 and 30 are joined by a conduit passage 38 which communicates with an outlet port 40, also provided in the body 12 of the valving assembly 10.

As previously mentioned, the four seal assemblies 18, 20, 22, and 24 are identical. Each sealing assembly 18, 20, 22, or 24, consists of a tubular housing 42 formed preferably of metal, and an internal sleeve-like scraper 44 made of a semi-resilient material, preferably fibre glass filled polytetrafluoroethylene or pure polytetrafluoroethylene, or other equivalent materials.

The scraper 44 of each sealing assembly 18, 20, 22, and 24, is provided with a flange 46 by which it is retained within its respective housing 42. The non-flanged end of each scraper 44 is backed up and urged radially inwardly by an O-ring 48 also contained in its respective housing 42. Leakage around the outer surface of the housing 42 is prevented by providing other O-rings 50 in the periphery of the hole or opening 14 adjacent each seal assembly 18, 20, 22 and 24, as shown in FIG. 1. The seal assemblies 18, 20, 22, and 24, and the spacers 26, 28, and 30 therefore are held in place in the body 12 by a retaining cover 86.

The reciprocating portion of the valving assembly 10 consists of a valve stem or valve 52. The valve 52 is provided with two spaced bearing surface portions 54 and 56, whose outer surfaces are smoothly ground and fitted to slide within the seal assemblies 18, 20, 22, and 24. An oversize shoulder 58 is provided at the inner end of bearing surface portion 54, and it travels in loose fit back and forth within a chamber 60 defined by the inner wall of spacer 30 and the seal assemblies 22 and 24.

The bearing surface portion 56 is provided with two valving ends 62 and 64 which are formed respectively by two spaced reduced diameter portions 66 and 68 of the valve 52. A pair of bushings 70 and 72 are free to slide upon these reduced diameter portions 66 and 68, respectively.

It is important to note that each bushing 70 and 72 is provided with a surface portion 74 of equivalent diameter and ground finish as the surface portion 56 between them. The bushings 70 and 72 are designed to fit squarely against the valve ends 62 and 64 of the surface portion 56 without appreciable gap.

The free end of the reduced diameter portion 68 of the valve 52 is provided with a spring retainer 76 for a coiled compression spring 78 located between the retainer 76 and the bushing 72. Another coiled compression spring 80 is provided on the reduced diameter portion 66 and bears against the retainer shoulder 58 and the end of bushing 70.

The bushings 70 and 72 are drilled lengthwise therethrough with a plurality of holes or apertures 82 and are provided with end flanges 84 for the springs 78 and 80 to bear against and for another purpose to be related.

Because the springs 78 and 80 continuously urge the bushings 70 and 72 against the ends of the surface portion 56, this surface portion 56 and the two adjoining external surfaces 74 of the bushings 70 and 72 can slide freely as a unit through the scrapers 44. The valve ends 62 and 64 of the bearing surface portion 56 have no appreciable gap to their respective bushings 70 and 73 and can glide beyond the scrapers 44 and return smoothly without catching thereon.

The operation of the improved valving assembly 10 will now be described. With the valve 52 in the position shown in FIG. 1, the valving assembly 10 is in a state of cut-off and no fluid will flow in the system. If the valve 52 is moved to the left, the flange 84 of bushing 70 will contact a surface 88 of the seal assembly 22 as shown in FIG. 2. At this point in the movement of the valve 52, the end surface 62 of the valve 52 will be pulled away from the end of bushing 70 and inlet port 36 will be connected to outlet port 40 as shown in FIG. 3, so that fluid is allowed to flow through the holes or apertures 82 in the bushing 70.

If valve 52 is moved to the right toward its extreme position, the flange 84 of bushing 72 will contact the end of seal assembly 18. As the valve 52 continues to move to the right, the end surface 64 of the valve 52 will pull away from the end of bushings 72 and outlet port 40 will be connected to atmosphere through the holes or apertures 82 in the bushing 72 as shown in FIG. 4. It can thus be noted that moving valve 52 to its extreme leftward position, will connect outlet port 40 to a pressure source attached to inlet port 36 and moving the valve 52 to its extreme rightward position will connect port 40 to atmosphere, as shown in FIGS. 3 and 4, respectively.

Figure 4:
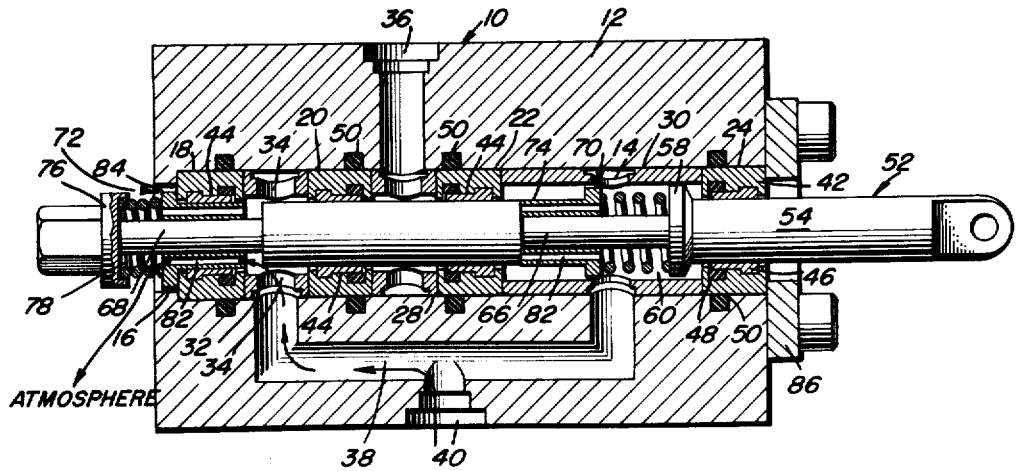
FIG. 4 is a vertical section, partly in elevation, of the valve assembly of FIG. 1 showing the valve shifted to its extreme right or discharge position.

If the valve 52 is in its extreme leftward position of FIG. 3 and is then moved toward the right, end surface 62 of valve 52 will contact the left end of bushing 70 and thus shut off substantially all the flow from the inlet port 36 to the outlet port 40. During this position of the movement of the valve 52, spring 80 holds the flange 84 against the end surface 88 of the seal assembly 22. After end surface 62 of valve 52 has contacted bushing 70, continued movement of the valve to the right will carry bushing 70 along with the valve, moving end surface 62 through the scraper 44 in seal assembly 22 to the point shown in FIG. 1. If the valve 52 is in its extreme rightward position as shown in FIG. 4, moving the valve to the left will cause the end surface 64 of valve 52 to contact the right end of bushings 72 before bushing 72 begins to move to the left along with valve 52. Continued movement of valve 52 to the left, will bring end surface 64 of valve 52 to the position shown in FIG. 1.

With the valve 52 in its centered position as shown in FIG. 1, seal assemblies 18 and 24 prevent leakage of fluid or medium from the outlet port 40 to atmosphere. Sealing assemblies 20 and 22 prevent leakage of fluid or medium from inlet port 36 to outlet port 40.

Obviously, many modifications and variations of the present invention are possible in light of the above teachings. It is, therefore, to be understood that within the scope of the appended claims the invention may be practiced otherwise than as specifically described.

What is claimed is:

1. In a cyclic sliding spool valve device, a housing having spaced chambers therein, an annular sealing cartridge including a semi-resilient sleeve member defining an aperture connecting said chambers to each other and an O-ring member compressing inwardly one end of said sleeve member, a spool movably positioned in said aperture for blocking the flow of fluid therethrough from one of said chambers to the other thereof, and permeable follow-up means interchangeably positionable with said spool and movable therewith during at least a portion of the movement of said spool, said permeable follow-up means passing said fluid through said permeable follow-up means from said one of said chambers to the other thereof when said spool is withdrawn from said aperture.

2. In a cyclic sliding spool valve device, a housing having spaced chambers therein, an annular sealing cartridge including a semi-resilient sleeve member defining an aperture connecting said chambers to each other and an O-ring member compressing inwardly one end of said sleeve member, a spool movably positioned in said aperture for blocking the flow of fluid therethrough from one of said chambers to the other thereof, and follow-up means having at least one passageway throughout the length thereof for passage of fluid therethrough, said follow-up means being interchangeably positionable with said spool and movable therewith during at least a portion of the movement of said spool, said follow-up means passing said fluid through said passage therein from said one of said chambers to the other thereof when said spool is withdrawn from said aperture.

3. In a cyclic sliding spool valve device, a housing having spaced chambers therein, cartridge sealing means having a biasable radially deformable scraper sleeve defining an aperture connecting said chambers together, a spool movably positioned in said sleeve for blocking the flow of fluid through said aperture from one of said chambers to the other thereof, said sleeve sealing the annular space between said seal and said spool when said spool is positioned therein so as to prevent leakage of said fluid therethrough, and follow-up means interchangeably positionable with said spool and movable therewith during at least a portion of the movement of said spool, said follow-up means having at least one passage extending throughout the length thereof for flow of said fluid therethrough, said follow-up means passing said fluid through said passage therein from said one of said chambers to the other thereof when said spool is withdrawn from said aperture.

4. In a cyclic sliding spool valve device, a housing having an annular sealing cartridge therein defining an aperture and having spaced chambers on opposite sides of said aperture and connected thereto, a spool movably positioned in said aperture for blocking the flow of fluid therethrough from one of said chambers to the other thereof, said sealing cartridge having a semi-resilient sleeve member in the wall of said aperture and encompassing said spool when said spool is in said aperture and an O-ring member comprising inwardly one end of said sleeve member for preventing leakage of a fluid between said sleeve member and spool, and permeable follow-up means interchangeably positionable with said spool and movable therewith during at least a portion of the movement of said spool, said permeable follow-up means passing said fluid therethrough from said one of said chambers to the other thereof when said spool is withdrawn from said aperture.

5. In a cyclic sliding spool valve device, an annular sealing cartridge defining an aperture extending from opposite sides, sealing cartridge including a semi-resilient sleeve member defining an aperture extending from opposite sides thereof and an O-ring member compressing inwardly one end of said sleeve member, a spool movably positioned in said aperture for blocking the flow of a medium therethrough from one side of said wall to the other thereof, and permeable follow-up means interchangeably positionable with said spool and movable therewith during at least a portion of the movement of said spool, said permeable follow-up means passing said fluid therethrough from said one side of said wall to the other thereof when said spool is withdrawn from said aperture.

6. In a cyclic sliding spool valve device as recited in claim 5, wherein said follow-up means consists of a bushing having a plurality of apertures extending longitudinally therethrough.

7. In a cyclic sliding spool valve device as recited in claim 5, wherein said sleeve member is made of a fibre glass filled polytetrafluoroethylene.

8. In a cyclic sliding spool valve device as recited in claim 5, wherein said sleeve member is made of pure polytetrafluoroethylene.

9. In a cyclic sliding spool valve device as recited in claim 5, and additionally means for biasing said follow-up means into engagement with said spool.

10. A valve device, comprising, a housing having an opening extending therein, at least three longitudinally spaced annular seal assemblies in said opening, a valve element extending through said opening and having a spool bearing surface of sufficient length to span said three seal assemblies but terminating short of the outer ends of the outer two seal assemblies, said seal assemblies sealing the annular space between the wall defining said opening and said spool bearing surface of said valve element and defining first and second annular chambers in said opening between successive seal assemblies, means in each said seal assembly for biasing its respective seal assembly into engagement with said spool bearing surface of said valve element, a fourth seal assembly positioned in said opening for said valve element in said housing and spaced from the outer side of said outer seal assembly for said first annular chamber for defining a third annular chamber, said housing having an inlet port communicating with said first annular chamber, said housing having an outlet port and a passageway therein communicating with said second annular chamber and said third annular chamber, biased means having a bearing surface corresponding in diameter to said spool bearing surface of said valve element and positioned at opposite ends of said spool bearing surface and arranged to have one end thereof engage its respective end of said spool bearing surface of said valve element, each said biased means having at least one aperture extending therethrough, the aperture of one of said biased means being arranged to communicate with said first and third annular chambers, with the aperture of said other biased means being arranged to communicate with said second chamber and exhaust, and means for separating said spool bearing surface from the end of its respective biasing means, whereby when said spool bearing surface of said valve element spans said first three seal assemblies, the flow of fluid from said inlet port to said outlet port is cut off; with the flow of fluid from said inlet port to said outlet port occurring when one end of said spool bearing surface of said valve element is withdrawn into said first annular chamber; and with said outlet port being exhausted to exhaust when the other end of said spool bearing surface of said valve element is withdrawn into said second annular chamber; with said spool bearing surface of said valve element and its respective biased means at either end thereof being extendable through its respective outer seal assembly without the loss of fluid through said seal assemblies.

11. A non-leaking valve device, comprising, a housing having an opening extending therein, three longitudinally spaced annular seal cartridges in said opening, a valve element extending through said opening and having a spool bearing surface of sufficient length to span said three seal cartridges but terminating short of the outer ends of the two outer seal cartridges, said seal cartridges sealing the annular space between the wall defining said opening and said spool bearing surface of said valve element and defining first and second annular chambers in said opening between successive seal cartridges, means in each said seal cartridge for biasing its respective seal cartridge into engagement with said spool bearing surface of said valve element, a fourth seal cartridge positioned in said opening for said valve element in said housing and spaced from the outer side of said outer seal cartridge for said first annular chamber for defining a third annular chamber, said housing having an inlet port communicating with said first annular chamber, and an outlet port and a passageway therein communicating with said second and third annular chambers, permeable biased means interchangeably positionable with said spool bearing surface and movable therewith during at least a portion of the movement of said spool bearing surface of said valve element and positioned at opposite ends of said spool bearing surface and arranged to have one end thereof engage its respective end of said spool bearing surface of said valve element, and means for separating said spool bearing surface from the end of its respective permeable biased means, so that fluid can be passed therethrough when said spool bearing surface is withdrawn therefrom.

12. A non-leaking valve device as recited in claim 11 wherein each said permeable biased means includes a bushing having a plurality of apertures extending longitudinally therethrough.

13. A non-leaking valve device as recited in claim 11, wherein each said seal cartridge contained a biased seal for engagement with said valve element consisting of a semi-resilient material.

14. A non-leaking valve device as recited in claim 13, wherein said semi-resilient seal material consists of fibre glass filled polytetrafluoroethylene.

15. A non-leaking valve device as recited in claim 13, wherein said semi-resilient seal material consists of pure polytetrafluoroethylene.

16. A non-leaking valve device as recited in claim 11, and additionally means for biasing each said permeable means into engagement with its respective end of said spool bearing surface of said valve element.

17. A non-leaking valve device, comprising, a housing having an opening extending therein, three longitudinally spaced annular seal cartridges in said opening, a thin-walled annular spacer located between each of said three seal cartridges, a valve element extending through said opening and having a spool bearing surface of sufficient length to span said three seal cartridges but terminating short of the outer ends of the two outer seal cartridges, said seal cartridges sealing the annular space between the wall defining said opening and said spool bearing surface of said valve element and defining first and second annular chambers in said opening between successive seal cartridges, means in each said seal cartridge for biasing its respective seal cartridge into engagement with said spool bearing surface of said valve element, a fourth seal cartridge positioned in said opening for said valve element in said housing and spaced from the outer side of said outer seal cartridge for said first annular chamber for defining a third annular chamber, another thin-walled annular spacer located between said outer seal cartridge and said fourth seal cartridge, all of said thin-walled annular spacers being thinner than adjacent seal cartridges so as to form a shoulder therewith and having an annular groove and a plurality of apertures therein opening into its respective annular chamber, said housing having an inlet port communicating with said first annular chamber, and an outlet port and a passageway therein communicating with said second and third annular chambers, said communicating being through the apertures in the thin-walled annular spacer in each annular chamber, and permeable biased means interchangeably positionable with said spool bearing surface and movable therewith during at least a portion of the movement of said spool bearing surface of said valve element and positioned at opposite ends of said spool bearing surface and arranged to have one end thereof engage its respective end of said spool bearing surface of said valve element, each said permeable biased means having a raised portion to engage a shoulder formed by adjacent seal cartridges and thin-walled annular spacers, whereby the spool bearing surfaces of said valve element is separated from its respective permeable biased means so that fluid can be passed therethrough when said spool bearing surface is withdrawn therefrom.

18. The non-leaking valve device of claim 17, wherein the opening extending in said housing has an inwardly extending shoulder adjacent one end of said opening and in addition, retaining means is positioned at the other thereof.

References Cited in the file of this patent

UNITED STATES PATENTS

| 1,385,019 | Mathieu | July 19, 1921 |
| 2,469,921 | Hoge | May 10, 1949 |
| 2,757,896 | Sangster | Aug. 7, 1956 |
| 2,837,114 | Ruhl | June 3, 1958 |
| 2,938,704 | Quail | May 31, 1960 |
| 2,944,527 | Kaay | July 12, 1960 |
| 2,965,123 | Hulslander | Dec. 20, 1960 |

FOREIGN PATENTS

| 1,173,092 | France | Oct. 20, 1958 |

UNITED STATES PATENT OFFICE
CERTIFICATE OF CORRECTION

Patent No. 3,113,591                  December 10, 1963

Milton C. Neuman et al.

It is hereby certified that error appears in the above numbered patent requiring correction and that the said Letters Patent should read as corrected below.

Column 4, lines 40 and 41, strike out "sealing cartridge defining an aperture extending from opposite sides,".

Signed and sealed this 28th day of April 1964.

(SEAL)
Attest:

ERNEST W. SWIDER                  EDWARD J. BRENNER
Attesting Officer                   Commissioner of Patents